United States Patent
Da et al.

(10) Patent No.: US 12,153,151 B2
(45) Date of Patent: Nov. 26, 2024

(54) METHOD AND DEVICE FOR DETERMINING POSITIONING MEASUREMENT

(71) Applicant: DATANG MOBILE COMMUNICATIONS EQUIPMENT CO.,LTD., Beijing (CN)

(72) Inventors: Ren Da, Beijing (CN); Bin Ren, Beijing (CN); Deshan Miao, Beijing (CN); Hui Li, Beijing (CN); Xueyuan Gao, Beijing (CN); Gang Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 390 days.

(21) Appl. No.: 17/600,115

(22) PCT Filed: Mar. 12, 2020

(86) PCT No.: PCT/CN2020/079071
§ 371 (c)(1),
(2) Date: Sep. 30, 2021

(87) PCT Pub. No.: WO2020/199898
PCT Pub. Date: Oct. 8, 2020

(65) Prior Publication Data
US 2022/0155401 A1    May 19, 2022

(30) Foreign Application Priority Data
Apr. 2, 2019   (CN) ......................... 201910262967.X

(51) Int. Cl.
*G01S 5/00*   (2006.01)
*G01S 5/02*   (2010.01)
(Continued)

(52) U.S. Cl.
CPC .......... *G01S 5/0036* (2013.01); *G01S 5/0215* (2013.01); *H04B 17/318* (2015.01);
(Continued)

(58) Field of Classification Search
CPC .... G01S 5/0036; G01S 5/0215; G01S 5/0221; G01S 5/0268; H04B 17/318;
(Continued)

(56) References Cited

U.S. PATENT DOCUMENTS 9,026,094 B2 *   5/2015   Siomina .................. H04W 4/02
                                                                455/456.2
2015/0341895 A1 *  11/2015   Zhang ................. G01S 5/02527
                                                                455/456.1
(Continued)

FOREIGN PATENT DOCUMENTS

CN    1360804 A    7/2002
CN    1413058 A    4/2003
(Continued)

OTHER PUBLICATIONS

3GPP TR 36.855 V13.0.0, 3rd Generation Partnership Project;Technical Specification Group Radio Access Network; Feasibility of positioning enhancements for E-UTRA (Release 13), total 52 pages, Jan. 2015.
(Continued)

*Primary Examiner* — Don N Vo
(74) *Attorney, Agent, or Firm* — Kilpatrick Townsend & Stockton LLP

(57) ABSTRACT

Disclosed in the present application is a method and device for determining a positioning measurement. The method for determining the positioning measurements provided by the present application includes: measuring, by receiver units in a receiver unit array, measurements used for positioning; and determining, on the basis of the measurements used for
(Continued)

```
┌─────────────────────────────────────────────────────────────┐
│  measuring, by receiver units in a receiver unit array,     │      S101
│  measurements used for positioning                          │
└─────────────────────────────────────────────────────────────┘

┌─────────────────────────────────────────────────────────────┐
│  determining, based on the measurements used for positioning│      S102
│  measured by the receiver units in the receiver unit array, │
│  an optimal measurement used for positioning                │
└─────────────────────────────────────────────────────────────┘
``` positioning measured by the receiver units in the receiver unit array, an optimal measurement used for positioning.

2 Claims, 2 Drawing Sheets

(51) Int. Cl.
  *H04B 17/318* (2015.01)
  *H04B 17/336* (2015.01)
  *H04L 5/00* (2006.01)
  *H04W 24/10* (2009.01)
(52) U.S. Cl.
  CPC ......... *H04B 17/336* (2015.01); *H04L 5/0051* (2013.01); *H04W 24/10* (2013.01)
(58) Field of Classification Search
  CPC ... H04B 17/336; H04B 17/364; H04L 5/0051; H04W 24/10; H04W 64/00; H04W 64/006
  USPC ...................................................... 455/456.1
  See application file for complete search history.

(56) References Cited

U.S. PATENT DOCUMENTS

| | | |
|---|---|---|
| 2016/0286552 A1 | 9/2016 | Lim et al. |
| 2018/0054294 A1 | 2/2018 | Rappaport et al. |
| 2018/0054796 A1* | 2/2018 | Edge ..................... H04W 4/029 |
| 2018/0146332 A1* | 5/2018 | Opshaug .................. G01S 5/10 |
| 2020/0217918 A1* | 7/2020 | Rydén .................... H04W 4/029 |
| 2021/0392609 A1* | 12/2021 | Siomina ................ H04W 64/00 |
| 2022/0095261 A1* | 3/2022 | Smith ....................... G01S 5/06 |
| 2022/0150865 A1* | 5/2022 | Cha ......................... G01S 5/011 |

FOREIGN PATENT DOCUMENTS

| | | |
|---|---|---|
| CN | 1576877 A | 2/2005 |
| CN | 101616482 A | 12/2009 |
| CN | 102045840 A | 5/2011 |
| CN | 105264920 A | 1/2016 |
| CN | 105873211 A | 8/2016 |
| CN | 108293172 A | 7/2018 |
| KR | 20110050400 A | 5/2011 |
| KR | 20120034168 A | 4/2012 |

OTHER PUBLICATIONS

3GPP TS 36.214 V15.3.0, 3rd Generation Partnership Project; Technical Specification Group Radio Access Network; Evolved Universal Terrestrial Radio Access (E-UTRA); Physical layer; Measurements (Release 15), total 25 pages, Sep. 2018.
3GPP TS 38.215 V15.4.0, 3rd Generation Partnership Project; Technical Specification Group Radio Access Network; NR; Physical layer measurements (Release 15), total 15 pages, Dec. 2018.

* cited by examiner

METHOD AND DEVICE FOR DETERMINING POSITIONING MEASUREMENT

CROSS-REFERENCE TO RELATED APPLICATIONS

The present application is a US National Stage of International Application No. PCT/CN2020/079071, filed on Mar. 12, 2020, which claims the priority of the Chinese patent application No. 201910262967.X filed to the China National Intellectual Property Administration on Apr. 2, 2019, and entitled "Method and Device for Determining Positioning Measurement Value", the entire contents of which are incorporated herein by reference.

FIELD

The present application relates to the field of communication, in particular to a method and device for determining a positioning measurement.

BACKGROUND

The 3rd generation partnership project (3GPP) will introduce various technologies used for 5G new radio (5G NR) positioning, such as a downlink time difference of arrival (DL TDOA) or a downlink reference signal time difference (DL RSTD), an uplink time difference of arrival (UL TDOA) and a round-trip time (RTT). Positioning accuracy of these positioning methods will depend on precision of positioning measurement.

In a 5G NR system, one wireless receiver (UE or gNB) may use a receiver diversity to receive reference signals transmitted by one wireless transmitter. The receiver has a receiver unit array combined by receiver units (also known as branches). All the receiver units in the receiver unit array may independently receive the reference signals transmitted by the wireless transmitter, and provide a measurement.

SUMMARY

Embodiments of the present application provide a method and device for determining a positioning measurement.

In the first aspect, a method for determining a positioning measurement provided by the embodiments of the present application, includes:
  measuring, by receiver units in a receiver unit array, measurements used for positioning; and
  determining, based on the measurements used for positioning measured by the receiver units in the receiver unit array, an optimal measurement used for positioning.

In one embodiment, the optimal measurement is determined in one of following modes:
  Mode 1: the optimal measurement is determined as a maximum measurement in the measurements used for positioning measured by all the receiver units in the receiver unit array;
  Mode 2: the optimal measurement is determined as a minimum measurement in the measurements used for positioning measured by all the receiver units in the receiver unit array or a measurement obtained at the earliest time in the measurements used for positioning measured by all the receiver units in the receiver unit array;
  Mode 3: the optimal measurement is determined as an average of the measurements used for positioning measured by all the receiver units in the receiver unit array; or
  Mode 4: the optimal measurement is determined as a weighted average of the measurements used for positioning measured by all the receiver units in the receiver unit array.

In one embodiment, a weighted parameter used in the Mode 4 is determined based on one or combination of following parameters:
  a signal noise ratio (SNR), a signal interference noise ratio (SINR), an interference noise ratio (INR), or received power (Power).

In one embodiment, when a terminal serves as a receiver, the measurements each is one of following measurements:
  a downlink reference signal time difference (DL RSTD);
  downlink reference signal received power (DL RSRP); or
  a time difference between receiving time and transmitting time of the terminal.

In one embodiment, an optimal DL RSTD is a relative time difference between the earliest arrival time of neighbor cell signals measured by all receiver units in the terminal and the earliest arrival time of reference cell signals measured by all the receiver units in the terminal.

In one embodiment, an optimal DL RSRP is a maximum, an average or a weighted average of DL RSRPs measured by all the receiver units in the terminal.

In one embodiment, an optimal measurement of the time difference between receiving time and transmitting time of the terminal is determined in following modes:
  the earliest arrival time of the cell signals measured by all the receiver units in the terminal on a downlink radio frame #i serves as a receiving time $T_{UE\text{-}RX}$ of the terminal, a time of transmitting an uplink radio frame #i by the terminal serves as a transmitting time $T_{UE\text{-}TX}$ of the terminal, a difference value between $T_{UE\text{-}RX}$ and $T_{UE\text{-}TX}$ serves as the optimal measurement, and #i is a frame number of the radio frame.

In one embodiment, when network side equipment serves as a receiving end, the measurements each is one of following measurements:
  an uplink time difference of arrival (UL-TDOA);
  uplink reference signal received power (UL-RSRP);
  a time difference between receiving time and transmitting time of the network side equipment; or
  an up angle of arrival (AoA).

In one embodiment, an optimal UL-TDOA is determined in following modes:
  the earliest arrival time of uplink reference signals of the terminal measured by all receiver units in the network side equipment serves as an arrival time of the uplink reference signals of the terminal, and a time difference between the arrival time of the uplink reference signals of the terminal and a preset reference time serves as the optimal UL-TDOA.

In one embodiment, an optimal UL-RSRP is a maximum, an average or a weighted value of UL-RSRPs measured by all the receiver units in the network side equipment.

In one embodiment, an optimal measurement of the time difference between receiving time and transmitting time of the network side equipment is determined in following modes:
  the earliest arrival time of terminal reference signals measured by all the receiver units in the network side equipment on a downlink radio frame #i serves as a receiving time $T_{gNB\text{-}RX}$ of the network side equipment, a time of transmitting the downlink radio frame #i by the network side equipment serves as a transmitting time $T_{gNB-TX}$ of the network side equipment, and a difference value between $T_{gNB-RX}$ and $T_{gNB-TX}$ serves as the optimal measurement.

In one embodiment, an optimal measurement of the up angle of arrival (AoA) is a maximum, an average or a weighted average of AoA measurements of the reference signals of the terminal measured by all the receiver units in the network side equipment.

In a second aspect, a device for determining a positioning measurement provided by the embodiments of the present application includes:
- a memory, configured to store a program instruction; and
- a processor, configured to call the program instruction stored in the memory, and according to an obtained program, perform a process of:
- measuring, by receiver units in a receiver unit array, measurements used for positioning; and
- determining, on the basis of the measurements used for positioning measured by the receiver units in the receiver unit array, an optimal measurement used for positioning.

In one embodiment, the optimal measurement is determined in one of following modes:
- Mode 1: the optimal measurement is determined as a maximum measurement in the measurements used for positioning measured by all the receiver units in the receiver unit array;
- Mode 2: the optimal measurement is determined as a minimum measurement in the measurements used for positioning measured by all the receiver units in the receiver unit array or a measurement obtained at the earliest time in the measurements used for positioning measured by all the receiver units in the receiver unit array;
- Mode 3: the optimal measurement is determined as an average of the measurements used for positioning measured by all the receiver units in the receiver unit array; or
- Mode 4: the optimal measurement is determined as a weighted average of the measurements used for positioning measured by all the receiver units in the receiver unit array.

In one embodiment, a weighted parameter used in the Mode 4 is determined based on one or combination of following parameters:
- a signal noise ratio (SNR), a signal interference noise ratio (SINR), an interference noise ratio (INR), or received power (Power).

In one embodiment, when the device is a terminal, the measurements each is one of the following measurements:
- a downlink reference signal time difference (DL RSTD);
- downlink reference signal received power (DL RSRP); or
- a time difference between receiving time and transmitting time of the terminal.

In one embodiment, an optimal DL RSTD is a relative time difference between the earliest arrival time of neighbor cell signals measured by all the receiver units in the terminal and the earliest arrival time of reference cell signals measured by all the receiver units in the terminal.

In one embodiment, an optimal DL RSRP is a maximum, an average or a weighted average of DL RSRPs measured by all the receiver units in the terminal.

In one embodiment, an optimal measurement of the time difference between receiving time and transmitting time of the terminal is determined in following modes:

the earliest arrival time of the cell signals measured by all the receiver units in the terminal on a downlink radio frame #i serves as a receiving time $T_{UE-RX}$ of the terminal, a time of transmitting an uplink radio frame #i by the terminal serves as a transmitting time $T_{UE-TX}$ of the terminal, a difference value between $T_{UE-RX}$ and $T_{UE-TX}$ serves as the optimal measurement, and #i is a frame number of the radio frame.

In one embodiment, when the device is network side equipment, the measurements each is one of following measurements:
- an uplink time difference of arrival (UL-TDOA);
- uplink reference signal received power (UL-RSRP);
- a time difference between receiving time and transmitting time of the network side equipment; or
- an up angle of arrival (AoA).

In one embodiment, an optimal UL-TDOA is determined in following modes:
- the earliest arrival time of uplink reference signals of the terminal measured by all receiver units in the network side equipment serves as an arrival time of the uplink reference signals of the terminal, and a time difference between the arrival time of the uplink reference signals of the terminal and a preset reference time serves as the optimal UL-TDOA.

In one embodiment, optimal UL-RSRP is a maximum, an average or a weighted average of UL-RSRPs measured by all the receiver units in the network side equipment.

In one embodiment, an optimal measurement of the time difference between receiving time and transmitting time of the network side equipment is determined in following modes:
- the earliest arrival time of terminal reference signals measured by all the receiver units in the network side equipment on a downlink radio frame #i serves as a receiving time $T_{gNB-RX}$ of the network side equipment, a time of transmitting the downlink radio frame #i by the network side equipment serves as a transmitting time $T_{gNB-TX}$ of the network side equipment, and a difference value between $T_{gNB-RX}$ and $T_{gNB-TX}$ serves as the optimal measurement.

In one embodiment, an optimal measurement of the up angle of arrival (AoA) is a maximum, an average or a weighted average of AoA measurements of the reference signals of the terminal measured by all the receiver units in the network side equipment.

In a third aspect, a device for determining a positioning measurement provided by the embodiments of the present application, includes:
- a first unit, configured to measure, by receiver units in a receiver unit array, measurements used for positioning; and
- a second unit, configured to determine, based on the measurements used for positioning measured by the receiver units in the receiver unit array, an optimal measurement used for positioning.

In a fourth aspect, the present application provides electronic equipment, including a memory and a processor, and the memory is configured to store a program instruction, and the processor is configured to call the program instruction stored in the memory, and execute the above any method according to the obtain program.

In a fifth aspect, the present application provides a computer storage medium. The computer storage medium stores a computer executable instruction, and the computer executable instruction is configured to enable a computer to execute the above any method.

BRIEF DESCRIPTION OF THE DRAWINGS

In order to illustrate the embodiments of the present application more clearly, drawings needing to be used in description of the embodiments will be introduced below briefly. The drawings in the description below are only some embodiments of the present application.

DETAILED DESCRIPTION OF THE EMBODIMENTS

Figure 1:
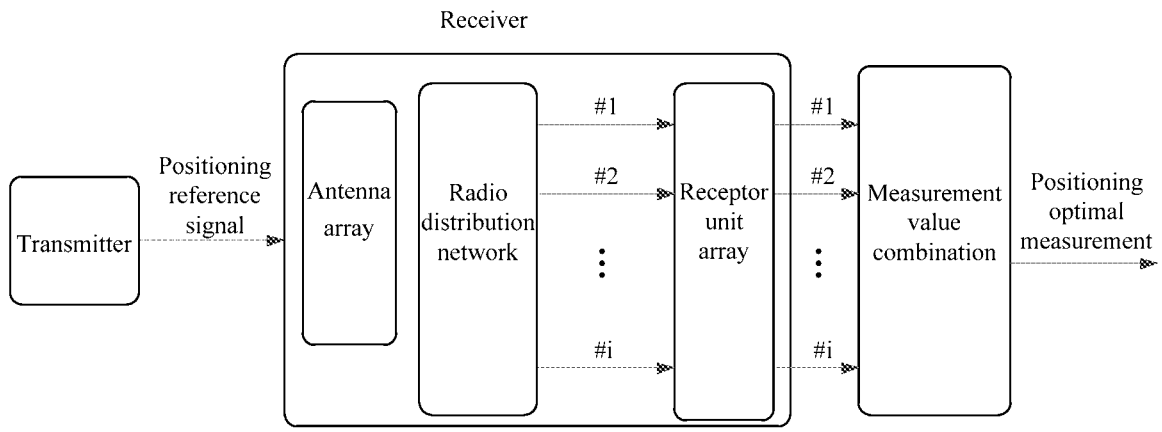
FIG. 1 is a schematic architecture diagram of equipment using a receiver diversity to obtain an optimal measurement used for positioning provided by some embodiments of the present application.

The embodiments of the present application will be described clearly and completely with reference to the drawings in the embodiments of the present application. The described embodiments are only part of the embodiments of the present application, but not all the embodiments.

"And/or" in the embodiments of the present application describes an association relationship of an association object, and represents that there may be three kinds of relationships, for example, A and/or B, may represent: A exists alone, A and B exist at the same time, and B exist alone. A character "/" generally represents that the previous and next association objects are in an "or" relationship.

At present, a positioning measurement defined in 3GPP has not considered how to obtain optimal positioning measurement from positioning measurements measured by receiver branches (also known as units). The 3GPP is discussing how to define the positioning measurements used for supporting 5G NR positioning. One of the problems is how to obtain the optimal positioning measurement from the positioning measurements measured by the plurality of receiver units. That is to say, the positioning measurements defined in the 3GPP have not considered how to obtain the optimal positioning measurement from the positioning measurements measured by the plurality of receiver units.

Embodiments of the present application provide a method and device for determining a positioning measurement, for obtaining optimal positioning measurement from positioning measurements measured by receiver units.

The method and device are based on the same application concept. Principles of the method and the device for solving the problems are similar, and therefore, implementation of the device and the method may refer to each other, which is not repeated here.

The embodiments of the present application may be applicable to various systems, especially a 5G system. For example, the applicable systems may be a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD), a universal mobile telecommunication system (UMTS), a worldwide interoperability for microwave access (WiMAX) system, the 5G system, a 5G NR system, etc. These various systems include terminal equipment and network equipment.

The terminal equipment involved in the embodiments of the present application may be equipment pointed to a user and providing voice and/or data connectivity, handheld equipment having a wireless connection function, or other processing equipment connected to a wireless modem. In the different systems, names of the terminal equipment may also be different, for example, in the 5G system, the terminal equipment may be called as user equipment (UE). The wireless terminal equipment may be in communication with one or more core networks through a radio access network (RAN), the wireless terminal equipment may be mobile terminal equipment, such as a mobile telephone (or called as a "cellular" telephone) and a computer having the mobile terminal equipment, for example, may be a portable mobile device, a pocket mobile device, a handheld mobile device, a computer built-in mobile device or a vehicle-mounted mobile device, which exchange language and/or data with the radio access network. The wireless terminal equipment may be, for example, a personal communication service (PCS) telephone, a cordless telephone, a session initiated protocol (SIP) phone, a wireless local loop (WLL) station, a personal digital assistant (PDA), and other equipment. The wireless terminal equipment may also be called as a system, a subscriber unit, a subscriber station, a mobile station, a mobile, a remote station, an access point, a remote terminal, an access terminal, a user terminal, a user agent, a user device, which is not limited in the embodiment of the present application.

The network equipment involved in the embodiments of the present application may be a base station, and the base station may include cells. According to different specific application occasions, the base station may also be called as an access point, or may refer to equipment in communication with the wireless terminal equipment through one or more sectors on an air interface in an access network, or equipment with other names. The network equipment may be configured to interconvert a received air frame and an internet protocol (IP) group and serves as a router between the wireless terminal equipment and the rest part of the access network, and the rest part of the access network may include an internet protocol (IP) communication network. The network equipment may further coordinate attribute management to the air interface. For example, the network equipment involved in the embodiments of the present application may be network equipment (a base transceiver station, BTS) in the global system of mobile communication (GSM) or code division multiple access (CDMA), or network equipment (NodeB) in wide-band code division multiple access (WCDMA), or evolutional network equipment (evolutional Node B, eNB or e-NodeB) in a long term evolution (LTE) system, or a 5G base station in a 5G network architecture (next generation system), or a home evolved Node B (HeNB), a relay node, a Femto, a picocell base station (Pico), etc., which is not limited in the embodiments of the present application.

All the embodiments of the present application are described below in detail with reference to the drawings of the specification. It should be noted that a display order of the embodiments of the present application only represents the sequential order of the embodiments, rather than superiority and inferiority of the embodiments.

Referring to FIG. 1, when one wireless receiver (UE or gNB) uses a receiver diversity to receive reference signals transmitted by one wireless transmitter, the receiver has a compound antenna, which contains a radio distribution network (RDN), an antenna array, and one receiver unit array (or called as a receptor unit array) combined by receiver units. The certain quantity of antenna elements is distributed to each receiver unit. The RDN is a linear passive network and distributes radio power on the antenna array in a specific implementation mode. All the receiver units in the receiver unit array may in parallel and independently receive the reference signal transmitted by the wireless transmitter.

When one wireless receiver (UE or gNB) uses the receiver diversity to receive positioning reference signals transmitted by one wireless transmitter, it needs to consider how to obtain an optimal measurement used for positioning from positioning values measured by all the receiver units in the receiver unit array.

Obtaining the optimal measurement used for positioning from the positioning values measured by all the receiver units in the receiver unit array may have the following modes:

Mode 1: the optimal measurement is determined as a maximum measurement in the positioning values (namely, measured measurements used for positioning) measured by all the receiver units;

Mode 2: the optimal measurement is determined as a minimum measurement in the positioning values measured by all the receiver units (or a measurement obtained at the earliest time in the measurements);

Mode 3: the optimal measurement is determined as an average of the positioning values (namely, the measured measurements used for positioning) measured by all the receiver units; and Mode 4: the optimal measurement is determined as a weighted average of the positioning values (namely, the measured measurements used for positioning) measured by all the receiver units;

a weighted parameter may be determined based on a signal noise ratio (SNR), a signal interference noise ratio (SINR), an interference noise ratio (INR), or received power (Power).

At a terminal side, in order to support 5G NR positioning, the UE needs to provide the following measurements by measuring downlink positioning reference signals from a serving cell and a neighbor cell:

a downlink reference signal time difference (RSTD);
a downlink (DL) reference signal received power (RSRP); and
a time difference between receiving time and transmitting time (Rx-Tx) of the UE.

At a network side, in order to support 5G NR positioning, the gNB needs to provide the following measurements by measuring up positioning reference signals from the UE:

an uplink time difference of arrival (UL TDOA);
UL reference signal received power (RSRP);
a time difference receiving time and transmitting time (Rx-Tx) of the gNB; and
an up angle of arrival (AoA).

When one wireless receiver (the UE or the gNB) uses the receiver diversity, the method used for obtaining the optimal measurement of the above positioning measurements is provided as follows by examples.

1, the optimal measurement of the downlink reference signal time difference (RSTD):

the downlink reference signal time difference (DL RSTD) is a relative time difference between a reference signal of the neighbor cell arriving the UE and a reference signal of a reference cell arriving the UE. When the UE uses the receiver diversity to receive the reference signals from the neighbor cell and the reference cell, all the receiver units of a receiver will measure the reference signals from the neighbor cell and the reference cell at the same time. Due to influence of various factors, especially influence of multipath propagation, arrival times of the reference signals measured by all the receiver units of the same receiver are different even for the reference signal from the same cell. In order to minimize the influence of multipath as much as possible, for the optimal measurement of the DL RSTD, the earliest arrival time (or the minimum value of the arrival time) in the signals of the certain cell (the neighbor cell or the reference cell) measured by all the receiver units should serve as the arrival time of the signals of the cell firstly, and then the optimal measurement of the DL RSTD is obtained through the obtained arrival time of the reference signal of the neighbor cell and the obtained arrival time of the reference signal of the reference cell. That is: the DL RSTD is the relative time difference between the earliest arrival time of the neighbor cell signals measured by all the receiver units and the earliest arrival time of the reference cell signals measured by all the receiver units, or the DL RSTD is the relative time difference between the minimum of the arrival time of the neighbor cell signals measured by all the receiver units and the minimum of the arrival time of the reference cell signals measured by all the receiver units.

Therefore, the optimal RSTD measurement used for positioning is obtained based on the above Mode 2.

2, the optimal measurement of the uplink time difference of arrival (UL TDOA):

the uplink time difference of arrival (UL TDOA) of the NR is a time difference of the arrival time of an uplink reference signal received by the base station (gNB) relative to a preset reference time (for example, a GPS time). Similar to the receiving and transmitting (Rx-Tx) time difference of the UE, due to the influence of the various factors, especially the influence of the multipath propagation, the arrival times of the reference signals measured by all the receiver units of the receiver will be different for the uplink reference signal from the same UE. In order to minimize the influence of multipath as much as possible, for the optimal measurement of the TDOA, the earliest arrival time (or the minimum value of the arrival time) in the uplink reference signal of the certain UE measured by all the receiver units should serve as the arrival time of the uplink reference signal of the UE firstly, and then the optimal measurement of the TDOA is obtained through the time difference between the obtained arrival time of the uplink reference signal of the UE and the preset reference time.

The preset reference time may be determined according to actual needs, which is not limited in the embodiment of the present application.

Therefore, the optimal UL-TDOA measurement used for positioning may be obtained based on the above Mode 2.

3, the optimal measurement of the downlink reference signal received power (RSRP):

the RSRP is defined as a linear average of power (taking [W] as a unit) of a resource element of an antenna port of the reference signal bearing RSRP measurement. By measuring the average, measurement precision of the RSRP may be effectively improved generally, and influence of measurement noise and interference is reduced. That is: the optimal measurement of the RSRP of the certain positioning reference signal measured by the UE and transmitted by the certain cell should be the maximum, the average or the weighted average of the measurements of the reference signals measured by all the receiver units.

Therefore, the optimal down RSRP measurement used for positioning may be obtained based on the above Mode 1, the Mode 3 or the Mode 4.

4, the optimal measurement of the uplink reference signal received power (RSRP):

the RSRP is defined as the linear average value of the power (taking [W] as the unit) of the resource element of the antenna port of the reference signal bearing RSRP measurement. By measuring the average value, the measurement precision of the RSRP may be effectively improved generally, and the influence of the measurement noise and interference is reduced. Hence, the measured RSRP optimal measurement of the positioning reference signal received by the base station (gNB) and transmitted by the UE should be the maximum, the average or the weighted average of the measurements of the reference signals measured by all the receiver units.

Therefore, the optimal up RSRP measurement used for positioning may be obtained based on the above Mode 1, the Mode 3 or the Mode 4.

5, the optimal measurement of the time difference between receiving time and transmitting time (Rx-Tx) of the UE:

the UE Rx-Tx time difference is defined as $T_{UE-RX} - T_{UE-TX}$, and $T_{UE-RX}$ is a time of receiving a downlink radio frame #i from the reference signal of the serving cell by the UE, and $T_{UE-TX}$ is a time of transmitting an uplink radio frame #i by the UE. Due to the influence of the various factors, especially the influence of the multipath propagation, the arrival times $T_{UE-RX}$ of the reference signals measured by all the receiver units of the same receiver are different even for the reference signal from the same cell. In order to minimize the influence of the multipath propagation as much as possible, for the optimal measurement of the $T_{UE-RX}$, the earliest arrival time (or the minimum of the arrival time) in the signals of the certain cell (the serving cell or the neighbor cell) measured by all the receiver units should serve as the $T_{UE-TX}$ of the signals of the cell firstly, and then the optimal measurement of the UE Rx-Tx time difference is obtained through the obtained $T_{UE-RX}$ and $T_{UE-TX}$.

Therefore, the optimal UE Rx-Tx time difference measurement used for positioning may be obtained based on the above Mode 2.

6, the optimal measurement of the time difference between receiving time and transmitting time (Rx-Tx) of the base station (gNB):

the gNB Rx-Tx time difference is defined as $T_{gNB-RX} - T_{gNB-TX}$, and $T_{gNB-RX}$ is a time of receiving an uplink radio frame #i from the reference signal of the UE by the gNB, and $T_{gNB-TX}$ is a time of transmitting a downlink radio frame #i by the gNB. Similar to the UE Rx-Tx time difference, due to the influence of the various factors, especially the influence of the multipath propagation, the arrival times $T_{gNB-RX}$ of the reference signals measured by all the receiver units of the same receiver are different even for the reference signal from the same cell. In order to minimize the influence of the multipath propagation as much as possible, for the optimal measurement of the $T_{gNB-RX}$, the earliest arrival time (or the minimum of the arrival time) in the reference signals of the UE measured by all the receiver units should serve as $T_{gNB-RX}$ of the reference signal firstly, and then the optimal measurement of the gNB Rx-Tx time difference is obtained through $T_{gNB-RX}$ and $T_{gNB-TX}$ of the reference signal.

Therefore, the optimal base station Rx-Tx time difference measurement used for positioning may be obtained based on the above Mode 2.

7, the optimal measurement of the up angle of arrival (AoA):

the AoA is defined as an angle of the UE relative to the certain reference direction estimated by the base station (gNB) by utilizing the reference signal transmitted by the certain UE, for example, an azimuth angle and a pitch angle. Due to the influence of the various factors, especially the influence of the measurement noise, the AoA measured by all the receiver units of the same receiver are also different even for the reference signal from the same cell. By measuring the average value, the influence of the measurement noise and interference may be effectively reduced generally, and the measurement precision of the AoA is improved. Hence, the measured AoA optimal measurement of the certain positioning reference signal received by the base station (gNB) and transmitted by the certain UE may be the maximum, the average or the weighted average of the AoA measurements of the UE reference signal measured by all the receiver units.

Therefore, the optimal up AoA measurement used for positioning may be obtained based on the above Mode 1, the Mode 3 or the Mode 4.

Figure 2:
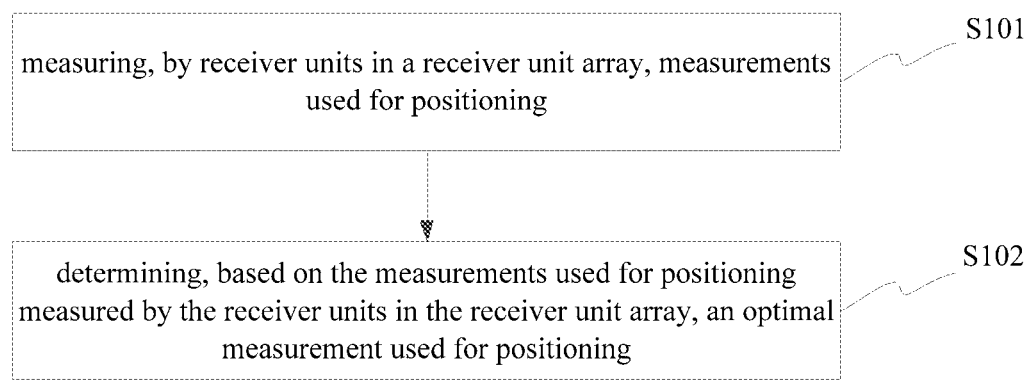
FIG. 2 is a schematic flow chart of a method for determining a positioning measurement provided by some embodiments of the present application.

In conclusion, referring to FIG. 2, at the terminal side or the network side, a method for determining a positioning measurement provided by the embodiment of the present application includes:

S101, measuring, by receiver units in a receiver unit array, measurements used for positioning; and S102, determining, based on the measurements used for positioning measured by the receiver units in the receiver unit array, an optimal measurement used for positioning.

According to the embodiment of the present application, the measurements used for positioning are measured by the receiver units in the receiver unit array, the optimal measurement used for positioning is determined on the basis of the measurements used for positioning measured by the receiver units in the receiver unit array, and thus an optimal positioning measurement may be obtained from the positioning measurements measured by the plurality of receiver units.

In one embodiment, the optimal measurement is determined in one of the following modes:

Mode 1: the optimal measurement is determined as a maximum measurement in the measurements used for positioning measured by all the receiver units in the receiver unit array;

Mode 2: the optimal measurement is determined as a minimum measurement in the measurements used for positioning measured by all the receiver units in the receiver unit array or a measurement obtained at the earliest time in the measurements used for positioning measured by all the receiver units in the receiver unit array;

Mode 3: the optimal measurement is determined as an average of the measurements used for positioning measured by all the receiver units in the receiver unit array; or Mode 4: the optimal measurement is determined as a weighted average of the measurements used for positioning measured by all the receiver units in the receiver unit array.

In one embodiment, a weighted parameter used in the Mode 4 is determined based on one or combination of the following parameters:

a signal noise ratio (SNR), a signal interference noise ratio (SINR), an interference noise ratio (INR), or received power (Power).

In one embodiment, when a terminal serves as a receiver, the measurements each is one of the following measurements:

a downlink reference signal time difference (DL RSTD); downlink reference signal received power (DL RSRP); or
a time difference between receiving time and transmitting time of the terminal.

In one embodiment, an optimal DL RSTD is a relative time difference between the earliest arrival time of neighbor cell signals measured by all the receiver units in the terminal and the earliest arrival time of reference cell signals measured by all the receiver units in the terminal.

In one embodiment, an optimal DL RSRP is a maximum, an average or a weighted value of the DL RSRPs measured by all the receiver units in the terminal.

In one embodiment, an optimal measurement of the time difference between receiving time and transmitting time of the terminal is determined through the following modes:

the earliest arrival time of the cell signals measured by all the receiver units in the terminal on a downlink radio frame #i serves as a receiving time $T_{UE-RX}$ of the terminal, a time of transmitting an uplink radio frame #i by the terminal serves as a transmitting time $T_{UE-TX}$ of the terminal, a difference value between $T_{UE-RX}$ and $T_{UE-TX}$ serves as the optimal measurement, and #i is a frame number of the radio frame.

In one embodiment, when network side equipment serves as a receiving end, the measurements each is one of the following measurements:

an uplink time difference of arrival (UL-TDOA);
uplink reference signal received power (UL-RSRP);
a time difference between receiving time and transmitting time of the network side equipment; or
an up angle of arrival (AoA).

In one embodiment, an optimal UL-TDOA is determined by adopting the following modes:

the earliest arrival time of uplink reference signals of the terminal measured by all the receiver units in the network side equipment serves as an arrival time of the uplink reference signals of the terminal, and a time difference between the arrival time of the uplink reference signals of the terminal and a preset reference time serves as the optimal UL-TDOA.

In one embodiment, optimal UL-RSRP is a maximum, an average or a weighted average of the UL-RSRPs measured by all the receiver units in the network side equipment.

In one embodiment, an optimal measurement of the receiving and transmitting time difference of the network side equipment is determined through the following modes:

the earliest arrival time of terminal reference signals measured by all the receiver units in the network side equipment on a downlink radio frame #i serves as a receiving time $T_{gNB-RX}$ of the network side equipment, a time of transmitting the downlink radio frame #i by the network side equipment serves as a transmitting time $T_{gNB-TX}$ of the network side equipment, and a difference value between $T_{gNB-RX}$ and $T_{gNB-TX}$ serves as the optimal measurement.

In one embodiment, an optimal measurement of the up angle of arrival (AoA) is a maximum, an average or a weighted average of AoA measurements of the reference signals of the terminal measured by all the receiver units in the network side equipment.

Figure 3:
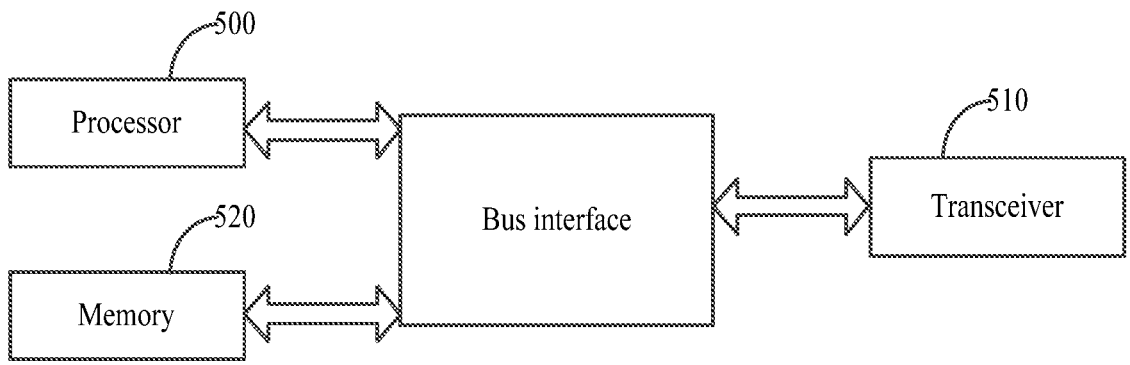
FIG. 3 is a schematic structural diagram of a device for determining a positioning measurement at a terminal side provided by some embodiments of the present application.

Referring to FIG. 3, at the network side, a device for determining a positioning measurement provided by an embodiment of the present application includes:

a memory 520, configured to store a program instruction;
a processor 500, configured to call the program instruction stored in the memory, and according to an obtained program, execute a process of:
measuring, by receiver units in a receiver unit array, measurements used for positioning; and
determining, based on the measurements used for positioning measured by the receiver units in the receiver unit array, an optimal measurement used for positioning.

In one embodiment, the optimal measurement is determined in one of the following modes:

Mode 1: the optimal measurement is determined as a maximum measurement in the measurements used for positioning measured by all the receiver units in the receiver unit array;

Mode 2: the optimal measurement is determined as a minimum measurement in the measurements used for positioning measured by all the receiver units in the receiver unit array or a measurement obtained at the earliest time in the measurements used for positioning measured by all the receiver units in the receiver unit array;

Mode 3: the optimal measurement is determined as an average of the measurements used for positioning measured by all the receiver units in the receiver unit array; or Mode 4: the optimal measurement is determined as a weighted average of the measurements used for positioning measured by all the receiver units in the receiver unit array.

In one embodiment, a weighted parameter used in the Mode 4 is determined based on one or combination of the following parameters:

a signal noise ratio (SNR), a signal interference noise ratio (SINR), an interference noise ratio (INR), or received power (Power).

In one embodiment, the measurements each is one of the following measurements:

an uplink time difference of arrival (UL-TDOA);
uplink reference signal received power (UL-RSRP);
a time difference between receiving time and transmitting time of the network side equipment; or
an up angle of arrival (AoA).

In one embodiment, an optimal UL-TDOA is determined by the following modes:

the earliest arrival time of uplink reference signals of the terminal measured by all the receiver units in the network side equipment serves as an arrival time of the uplink reference signals of the terminal, and a time difference between the arrival time of the uplink reference signals of the terminal and a preset reference time serves as the optimal UL-TDOA.

In one embodiment, optimal UL-RSRP is a maximum, an average or a weighted average of the UL-RSRPs measured by all the receiver units in the network side equipment.

In one embodiment, an optimal measurement of the time difference between receiving time and transmitting time of the network side equipment is determined through the following modes:

the earliest arrival time of terminal reference signals measured by all the receiver units in the network side equipment on a downlink radio frame #i serves as a receiving time $T_{gNB-RX}$ of the network side equipment, a time of transmitting the downlink radio frame #i by the network side equipment serves as a transmitting time $T_{gNB-TX}$ of the network side equipment, a difference value between $T_{gNB-RX}$ and $T_{gNB-TX}$ serves as the optimal measurement, and #i is a frame number of the radio frame.

In one embodiment, an optimal measurement of the up angle of arrival (AoA) is a maximum, an average or a weighted average of AoA measurements of the reference signals of the terminal measured by all the receiver units in the network side equipment.

A transceiver 510, configured to receive and transmit data under control of the processor 500.

In FIG. 3, a bus architecture may include any quantity of interconnected buses and bridges, which are specifically linked together by one or more processors represented by the processor 500 and various circuits of the memory represented by the memory 520. The bus architecture may further link various other circuits such as peripheral equipment, a voltage stabilizer and a power management circuit together, which are publicly known in the art and therefore are not further described herein. A bus interface provides an interface. The transceiver 510 may be components, namely, the transceiver may include a transmitter and a transceiver, and provide a unit configured to be in communication with various other devices on a transmission medium. The processor 500 is responsible for managing the bus architecture and usual processing, and the memory 520 may store data used by the processor 500 during operation execution.

The processor 500 may be a central processing unit (CPU), an application specific integrated circuit (ASIC), a field-programmable gate array (FPGA), or a complex programmable logic device (CPLD).

Figure 4:
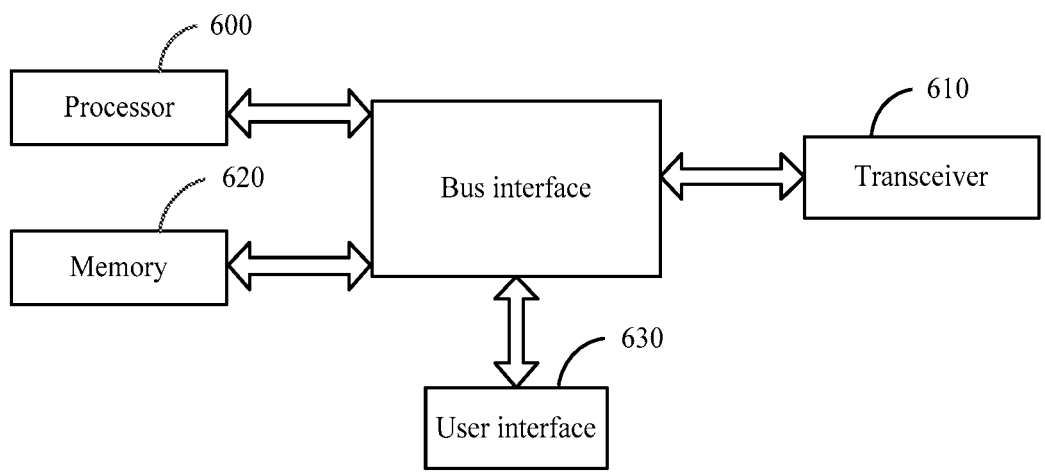
FIG. 4 is a schematic structural diagram of a device for determining a positioning measurement at a network side provided by some embodiments of the present application.

Referring to FIG. 4, at the terminal side, a device for determining a positioning measurement provided by an embodiment of the present application, includes:

a memory 620, configured to store a program instruction; and a processor 600, configured to call the program instruction stored in the memory, and according to an obtained program, execute a process of:

measuring, by receiver units in a receiver unit array, measurements used for positioning; and determining, based on the measurements used for positioning measured by the receiver units in the receiver unit array, an optimal measurement used for positioning.

In one embodiment, the optimal measurement is determined in one of the following modes:

Mode 1: the optimal measurement is determined as a maximum measurement in the measurements used for positioning measured by all the receiver units in the receiver unit array;

Mode 2: the optimal measurement is determined as a minimum measurement in the measurements used for positioning measured by all the receiver units in the receiver unit array or a measurement obtained at the earliest time in the measurements used for positioning measured by all the receiver units in the receiver unit array;

Mode 3: the optimal measurement is determined as an average of the measurements used for positioning measured by all the receiver units in the receiver unit array; or Mode 4: the optimal measurement is determined as a weighted average of the measurements used for positioning measured by all the receiver units in the receiver unit array.

In one embodiment, a weighted parameter used in the Mode 4 is determined based on one or combination of the following parameters:

a signal noise ratio (SNR), a signal interference noise ratio (SINR), an interference noise ratio (INR), or received power (Power).

In one embodiment, the measurements each is one of the following measurements:

a downlink reference signal time difference (DL RSTD);

downlink reference signal received power (DL RSRP); or a time difference between receiving time and transmitting time of the terminal.

In one embodiment, an optimal DL RSTD is a relative time difference of the earliest arrival time of neighbor cell signals measured by all the receiver units in the terminal and the earliest arrival time of reference cell signals measured by all the receiver units in the terminal.

In one embodiment, optimal DL RSRP is a maximum, an average or a weighted average of the DL RSRPs measured by all the receiver units in the terminal.

In one embodiment, an optimal measurement of the time difference between receiving time and transmitting time of the terminal is determined through the following modes:

the earliest arrival time of the cell signals measured by all the receiver units in the terminal on a downlink radio frame #i serves as a receiving time $T_{UE-RX}$ of the terminal, a time of transmitting an uplink radio frame #i by the terminal serves as a transmitting time $T_{UE-TX}$ of the terminal, a difference value between $T_{UE-RX}$ and $T_{UE-TX}$ serves as the optimal measurement, and #i is a frame number of the radio frame.

A transceiver 610, configured to receive and transmit data under control of the processor 600.

In FIG. 4, a bus architecture may include any quantity of interconnected buses and bridges, which are specifically linked together by one or more processors represented by the processor 600 and various circuits of the memory represented by the memory 620. The bus architecture may further link various other circuits such as peripheral equipment, a voltage stabilizer and a power management circuit together, which are publicly known in the art and therefore are not further described herein. A bus interface provides an interface. The transceiver 610 may be components, namely, the transceiver may include a transmitter and a transceiver, and provide a unit configured to be in communication with various other devices on a transmission medium. Aiming at different user equipment, a user interface 630 may further be an interface may be externally connected and internally connected with required equipment, and the connected equipment includes, but is not limited to a keypad, a displayer, a loudspeaker, a microphone, a joystick, etc.

The processor 600 is responsible for managing the bus architecture and usual processing, and the memory 620 may store data used by the processor 600 during operation execution.

In one embodiment, the processor 600 may be a central processing unit (CPU), an application specific integrated circuit (ASIC), a field-programmable gate array (FPGA), or a complex programmable logic device (CPLD).

Figure 5:
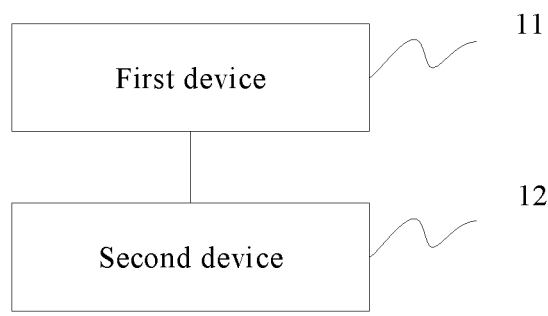
FIG. 5 is a schematic structural diagram of another device for determining a positioning measurement provided by some embodiments of the present application.

Referring to FIG. 5, another device for determining a positioning measurement provided by an embodiment of the present application, includes:

a first unit 11, configured to measure, by receiver units in a receiver unit array, measurements used for positioning; and a second unit 12, configured to determine, based on the measurements used for positioning measured by the receiver units in the receiver unit array, an optimal measurement used for positioning.

In one embodiment, the optimal measurement is determined in one of the following modes:

Mode 1: the optimal measurement is determined as a maximum measurement in the measurements used for positioning measured by all the receiver units in the receiver unit array;

Mode 2: the optimal measurement is determined as a minimum measurement in the measurements used for positioning measured by all the receiver units in the receiver unit array or a measurement obtained at the earliest time in the measurements used for positioning measured by all the receiver units in the receiver unit array;

Mode 3: the optimal measurement is determined as an average of the measurements used for positioning measured by all the receiver units in the receiver unit array; or Mode 4: the optimal measurement is determined as a weighted average of the measurements used for positioning measured by all the receiver units in the receiver unit array.

In one embodiment, a weighted parameter used in the Mode 4 is determined based on one or combination of the following parameters:

a signal noise ratio (SNR), a signal interference noise ratio (SINR), an interference noise ratio (INR), or received power (Power).

In one embodiment, when the device is a terminal, the measurements each is one of the following measurements:
a downlink reference signal time difference (DL RSTD);
downlink reference signal received power (DL RSRP); or
a time difference between receiving time and transmitting time of the terminal.

In one embodiment, an optimal DL RSTD is a relative time difference of the earliest arrival time of neighbor cell signals measured by all the receiver units in the terminal and the earliest arrival time of reference cell signals measured by all the receiver units in the terminal.

In one embodiment, an optimal DL RSRP is a maximum, an average or a weighted average of the DL RSRPs measured by all the receiver units in the terminal.

In one embodiment, an optimal measurement of the time difference between receiving time and transmitting time of the terminal is determined through the following modes:

the earliest arrival time of the cell signals measured by all the receiver units in the terminal on a downlink radio frame #i serves as a receiving time $T_{UE\text{-}RX}$ of the terminal, a time of transmitting an uplink radio frame #i by the terminal serves as a transmitting time $T_{UE\text{-}TX}$ of the terminal, and a difference value between $T_{UE\text{-}RX}$ and $T_{UE\text{-}TX}$ serves as the optimal measurement.

In one embodiment, when the device is network side equipment, the measurements each is one of the following measurements:
an uplink time difference of arrival (UL-TDOA);
uplink reference signal received power (UL-RSRP);
a time difference between receiving time and transmitting time of the network side equipment; or
an up angle of arrival (AoA).

In one embodiment, an optimal UL-TDOA is determined by adopting the following modes:

the earliest arrival time of uplink reference signals of the terminal measured by all the receiver units in the network side equipment serves as an arrival time of the uplink reference signals of the terminal, and a time difference between the arrival time of the uplink reference signals of the terminal and a preset reference time serves as the optimal UL-TDOA.

In one embodiment, an optimal UL-RSRP is a maximum, an average or a weighted average of the UL-RSRP measured by all the receiver units in the network side equipment.

In one embodiment, an optimal measurement of the time difference between receiving time and transmitting time of the network side equipment is determined through the following modes:

the earliest arrival time of terminal reference signals measured by all the receiver units in the network side equipment on a downlink radio frame #i serves as a receiving time $T_{gNB\text{-}RX}$ of the network side equipment, a time of transmitting the downlink radio frame #i by the network side equipment serves as a transmitting time $T_{gNB\text{-}TX}$ of the network side equipment, and a difference value between $T_{gNB\text{-}RX}$ and $T_{gNB\text{-}TX}$ serves as the optimal measurement.

Optionally, an optimal measurement of the up angle of arrival (AoA) is a maximum, an average or a weighted average of AoA measurements of the reference signals of the terminal measured by all the receiver units in the network side equipment.

It should be noted that dividing of units in the embodiments of the present application is schematic and only a kind of logical function dividing, and there may be other dividing modes in actual implementation. In addition, all functional units in all the embodiments of the present application may be integrated in one processing unit, or all the units exist independently and physically, or the two or more units are integrated in one unit. The above integrated unit may be implemented in a hardware form or in a software function unit form.

The integrated unit may be stored in a computer readable storage medium when being implemented in the software function unit form and serving as an independent product to be sold or used. A computer software product is stored in a storage medium, and includes instructions used to cause computer equipment (may be a personal computer, a server, a network equipment, etc.) or a processor to execute all or parts of the steps of the methods in all the embodiments of the present application. The aforementioned storage mediums include: various mediums may store program codes, such as a U disk, a mobile hard disk, a read-only memory (ROM), a random access memory (RAM), a diskette or an optical disk.

Embodiments of the present application provide electronic equipment. The electronic equipment may specifically be a desktop computer, a portable computer, a smart phone, a tablet computer, a personal digital assistant (PDA), etc. The electronic equipment may include a center processing unit (CPU), a memory, input/output equipment and so on, the input equipment may include a keyboard, a mouse, a touch screen, etc., and the output equipment may include display equipment, such as a liquid crystal display (LCD) and a cathode ray tube (CRT).

The memory may include the ROM and the RAM, and provide program instructions and data stored in the memory to the processor. In the embodiment of the present application, the memory may be configured to store a program of any method provided by the embodiments of the present application.

The processor is configured to execute any method provided by the embodiments of the present application according to the obtained program instructions by calling the program instructions stored in the memory.

Embodiments of the present application provide a computer storage medium, configured to store a computer executable instruction used by the device provided by the embodiment of the present application, and including a program configured to execute any method provided by the above embodiments of the present application.

The computer storage medium may be any available mediums capable of being accessed by the computer or data storage equipment, including but not limited to a magnetic memory (such as a floppy disk, a hard disk, a magnetic tape and a magnetic optical (MO)), an optical memory (such as a CD, a DVD, a BD, and an HVD), and a semiconductor memory (such as an ROM, an EPROM, an EEPROM, a nonvolatile memory (NAND FLASH) and a solid state disk (SSD)), etc.

The methods provided by the embodiments of the present application may be applied to the terminal equipment or the network equipment.

The terminal equipment may also be called as user equipment (UE for short), a mobile station (MS for short), a mobile terminal and so on. In one embodiment, the terminal may have the capability of being in communication with one or more core networks through a radio access network (RAN). For example, the terminal may be a mobile telephone (or called as a "cellular" telephone), or a computer having the mobile nature, for example, the terminal may further be a portable mobile device, a pocket mobile device, a handheld mobile device, a computer built-in mobile device or a vehicle-mounted mobile device.

The network equipment may be a base station (for example, an access point), referring to equipment in communication with a wireless terminal through one or more sectors on an air interface in an access network. The base station may be configured to interconvert a received air frame and an IP group and serves as a router between the wireless terminal and the rest part of the access network, and the rest part of the access network may include an interne protocol (IP) network. The base station may further coordinate attribute management to the air interface. For example, the base station may be a base station (base transceiver station, BTS) in GSM or CDMA, or a base station (NodeB) in WCDMA, or evolutional base station (NodeB or eNB or e-NodeB, evolutional Node B) in LTE, or gNB in a 5G system, etc., which is not limited in the embodiments of the present application.

The processing flow of the above methods may be implemented through a software program. The software program may be stored in the storage medium. The above method steps are executed when the stored software program is called.

In conclusion, the 3GPP has not defined how to obtain the optimal positioning measurement from the positioning measurements measured by the plurality of receiver units. The embodiments of the present application provide the method and device for obtaining optimal positioning measurement from the positioning measurements measured by the plurality of receiver units.

The embodiments of the present application can be provided as methods, systems or computer program products. Therefore, the present application can adopt forms of full hardware embodiments, full software embodiments, or embodiments combining software and hardware aspects. Moreover, the present application can adopt a form of the computer program products implemented on one or more computer available storage mediums (including but not limited to a disk memory, an optical memory and the like) containing computer available program codes.

The present application is described with reference to flow charts and/or block diagrams of the methods, the equipment (systems), and the computer program products according to the embodiments of the present application. It should be understood that each flow and/or block in the flow charts and/or the block diagrams and combinations of the flows and/or the blocks in the flow charts and/or the block diagrams can be implemented by computer program instructions. The computer program instructions may be provided to a processor of a general-purpose computer, a special-purpose computer, an embedded processing machine or other programmable data processing equipment, generating a machine, the instructions, when executed by the processor of the computers or other programmable data processing equipment, generate devices for implementing functions specified in one or more flows in the flow charts and/or one or more blocks in the block diagrams.

The computer program instructions may also be stored in a computer readable memory which can guide the computers or other programmable data processing equipment to work in a specific mode, thus the instructions stored in the computer readable memory generates an article of manufacture that includes a commander device that implement the functions specified in one or more flows in the flow charts and/or one or more blocks in the block diagrams.

The computer program instructions may also be loaded to the computers or other programmable data processing equipment, so that a series of operating steps may be executed on the computers or other programmable equipment to generate computer-implemented processing, the instructions executed on the computers or other programmable equipment provide steps for implementing the functions specified in one or more flows in the flow charts and/or one or more blocks in the block diagrams.

What is claimed is:

1. A method for determining a positioning measurement, comprising:

measuring, by receiver units in a receiver unit array, measurements used for positioning; and determining, based on the measurements used for positioning measured by the receiver units in the receiver unit array, a first measurement used for positioning;

wherein the first measurement is determined as a maximum measurement in the measurements used for positioning measured by all the receiver units in the receiver unit array;

wherein when a terminal serves as a receiver, the measurements each is one of following measurements: a downlink reference signal time difference (DL RSTD); downlink reference signal received power (DL RSRP); or a time difference between receiving time and transmitting time of the terminal;

wherein when the measurements are the DL RSTDs, the first measurement is a relative time difference between the earliest arrival time of neighbor cell signals measured by all the receiver units in the terminal and the earliest arrival time of reference cell signals measured by all the receiver units in the terminal; or, when the measurements are the DL RSRPs, the first measurement is a maximum value of the DL RSRPs measured by all the receiver units in the terminal; or, when the measurements are the time differences between the receiving time and the transmitting time of the terminal, the earliest arrival time of the cell signals measured by all the receiver units in the terminal on a downlink radio frame #i serves as a receiving time $T_{UE\text{-}RX}$ of the terminal, a time of transmitting an uplink radio frame #i by the terminal serves as a transmitting time $T_{UE\text{-}TX}$ of the terminal, a difference value between $T_{UE\text{-}RX}$ and $T_{UE\text{-}TX}$ serves as the first measurement, and #i is a frame number of the radio frame;

or, when network side equipment serves as a receiver, the measurements each is one of following measurements: an uplink time difference of arrival (UL-TDOA); an uplink reference signal received power (UL-RSRP); a time difference between receiving time and transmitting time of the network side equipment; or an uplink angle of arrival (AoA);

wherein when the measurements are the UL-TDOAs, the earliest arrival time of uplink reference signals of the terminal measured by all receiver units in the network side equipment serves as an arrival time of the uplink reference signals of the terminal, and a time difference between the arrival time of the uplink reference signals of the terminal and a preset reference time serves as the first measurement; or, when the measurements are the UL-RSRPs, the first measurement is a maximum value of UL-RSRPs measured by all the receiver units in the network side equipment; or, when the measurements are time differences between receiving time and transmitting time of the network side equipment, the earliest arrival time of terminal reference signals measured by all the receiver units in the network side equipment on a downlink radio frame #i serves as a receiving time $T_{gNB\text{-}RX}$ of the network side equipment, a time of transmitting the downlink radio frame #i by the network side equipment serves as a transmitting time $T_{gNB\text{-}TX}$ of the network side equipment, and a difference value between $T_{gNB\text{-}RX}$ and $T_{gNB\text{-}TX}$ serves as the first measurement; or, when the measurements are the AoAs, the first measurement is a maximum value of AoA measurements of reference signals of a terminal measured by all the receiver units in the network side equipment.

2. A device for determining a positioning measurement, comprising:
a memory, configured to store a program instruction; and
a processor, configured to call the program instruction stored in the memory, and according to an obtained program, perform a process of:
measuring, by receiver units in a receiver unit array, measurements used for positioning; and
determining, based on the measurements used for positioning measured by the receiver units in the receiver unit array, a first measurement used for positioning;

wherein the first measurement is determined as a maximum measurement in the measurements used for positioning measured by all the receiver units in the receiver unit array;

wherein when the device is a terminal, the measurements each is one of following measurements: a downlink reference signal time difference (DL RSTD); downlink reference signal received power (DL RSRP); or a time difference between receiving time and transmitting time of the terminal;

when the measurements are the DL RSTDs, the first measurement is a relative time difference between the earliest arrival time of neighbor cell signals measured by all the receiver units in the terminal and the earliest arrival time of reference cell signals measured by all the receiver units in the terminal; or, when the measurements are the DL RSRPs, the first measurement is a maximum value of the DL RSRPs measured by all the receiver units in the terminal; or, when the measurements are the time differences between the receiving time and the transmitting time of the terminal, the earliest arrival time of the cell signals measured by all the receiver units in the terminal on a downlink radio frame #i serves as a receiving time $T_{UE\text{-}RX}$ of the terminal, a time of transmitting an uplink radio frame #i by the terminal serves as a transmitting time $T_{UE\text{-}TX}$ of the terminal, a difference value between $T_{UE\text{-}RX}$ and $T_{UE\text{-}TX}$ serves as the first measurement, and #i is a frame number of the radio frame;

or, wherein when the device is network side equipment, the measurements each is one of following measurements: an uplink time difference of arrival (UL-TDOA); an uplink reference signal received power (UL-RSRP); a time difference between receiving time and transmitting time of the network side equipment; or an uplink angle of arrival (AoA);

wherein when the measurements are the UL-TDOAs, the earliest arrival time of uplink reference signals of the terminal measured by all receiver units in the network side equipment serves as an arrival time of the uplink reference signals of the terminal, and a time difference between the arrival time of the uplink reference signals of the terminal and a preset reference time serves as the first measurement; or, when the measurements are the UL-RSRPs, the first measurement is a maximum value of UL-RSRPs measured by all the receiver units in the network side equipment; or, when the measurements are time differences between receiving time and transmitting time of the network side equipment, the earliest arrival time of terminal reference signals measured by all the receiver units in the network side equipment on a downlink radio frame #i serves as a receiving time $T_{gNB\text{-}RX}$ of the network side equipment, a time of transmitting the downlink radio frame #i by the network side equipment serves as a transmitting time $T_{gNB\text{-}TX}$ of the network side equipment, and a difference value between $T_{gNB\text{-}RX}$ and $T_{gNB\text{-}TX}$ serves as the first measurement; or, when the measurements are the AoAs, the first measurement is a maximum value of AoA measurements of reference signals of a terminal measured by all the receiver units in the network side equipment.

* * * * *